（12） United States Patent
Cooke

(10) Patent No.: US 11,606,202 B2
(45) Date of Patent: Mar. 14, 2023

(54) METHODS AND SYSTEMS FOR SECURE DATA TRANSMISSION

(71) Applicant: GBR14 Limited, Gloucestershire (GB)

(72) Inventor: Neil Edward John Cooke, Gloucestershire (GB)

(73) Assignee: AMARYLLIS VENTURES LIMITED, Evesham (GB)

( * ) Notice: Subject to any disclaimer, the term of this patent is extended or adjusted under 35 U.S.C. 154(b) by 737 days.

(21) Appl. No.: 16/434,821

(22) Filed: Jun. 7, 2019

(65) Prior Publication Data

US 2019/0379533 A1 Dec. 12, 2019

(30) Foreign Application Priority Data

Jun. 7, 2018 (GB) ...................................... 1809385

(51) Int. Cl.
*H04L 9/08* (2006.01)
*H04L 9/06* (2006.01)
*H04L 9/12* (2006.01)

(52) U.S. Cl.
CPC ............ *H04L 9/085* (2013.01); *H04L 9/0643* (2013.01); *H04L 9/0819* (2013.01); *H04L 9/12* (2013.01)

(58) Field of Classification Search
CPC ...................................................... H04L 9/085
See application file for complete search history.

(56) References Cited

U.S. PATENT DOCUMENTS

| 9,135,462 | B2 * | 9/2015 | Scharf | ................... H04L 9/0838 |
| 10,530,577 | B1 * | 1/2020 | Pazhoor | ................ H04L 9/3247 |
| 2015/0180835 | A1 * | 6/2015 | Saxena | ............... H04L 67/1097 |
| | | | | 713/153 |
| 2019/0050854 | A1 * | 2/2019 | Yang | ...................... G06Q 10/00 |

\* cited by examiner

*Primary Examiner* — Simon P Kanaan
(74) *Attorney, Agent, or Firm* — Tarolli, Sundheim, Covell & Tummino LLP

(57) ABSTRACT

A method is disclosed of secure data transmission comprising sending a data request from a client device to a server device, the data request comprising a first share of a first encryption key, and a first location in the database at which is located desired double-encrypted data; receiving the sent data request at the server device; extracting, at the server device, the first share and the first location from the received data request; obtaining, at the server device, the desired double-encrypted data from the database using the extracted first location; generating, at the server device, the first encryption key using the extracted first share and one or more additional shares of the first encryption key held by the server device; and decrypting, at the server device, the obtained desired double-encrypted data using the generated first encryption key to form single-encrypted data.

16 Claims, 8 Drawing Sheets

METHODS AND SYSTEMS FOR SECURE DATA TRANSMISSION

FIELD OF THE INVENTION

The present invention relates to methods and systems for secure data transmission. Specific embodiments relate to a method of decrypting double-encrypted data to form unencrypted data.

BACKGROUND OF THE INVENTION

Data represents information within a computer system. Depending on the nature of the information, some data can be open and freely distributed to any party, whereas other data can be restricted in the sense that access to the data may be granted only under certain conditions. For example, access to restricted data may depend on one or more attributes of the party requesting the data, such as, their name, location, job title, etc. Therefore, within a computer system, it is known to implement access control methods which control (e.g. permit or prevent) access to restricted data based on certain criteria.

It is known to store data on a database. The database may be in communication with a server device which may function to control or manage the contents of the database. For example, the server device may fetch stored data from the database, and store new or updated data on the database. One of the functions of the server device may be to provide data from the database to one or more client devices which are in communication with the server device. In an example, the server device and the database may be operated by a service provider, and each client device may be operated by a customer of the service provider. For instance, the service provider may be an online email service provider and each customer may have an email account with the email service provider. As such, the server device may be responsible for fetching a customer's email data from the database at the customer's request.

Whilst the server device may have access to all data stored on the database, each client device may only have access to a subset of this data. For example, a client device may have access only to email data stored on the database which relates to a specific owner or operator of the client device. Stated differently, the client device may not have access to email data stored on the database which relates to persons other than the specific owner or operator. As such, the server device may act as a gateway between the client device(s) and the data stored on the database. Further, it is known for the server device to provide stored data from the database to a client device based on one or more attributes of the client device or an owner or operator of the client device.

A communication channel between the server device and the database may be secure (aka "secured channel") in the sense that the channel may be resistant to other parties intercepting communications transmitted between the server device and the database. On the other hand, a communication channel between the server device and a client device may be unsecured (aka "unsecured channel") in the sense that the channel may be susceptible to other parties intercepting communications transmitted between the server device and the database.

In view of the unsecured nature of the communication channel between the server device and the client device, it is known for communications transmitted via the unsecured channel to be encrypted. Encryption is the process of converting data to an unrecognizable or "encrypted" form. It is commonly used to protect sensitive information so that only authorized parties can view it. Encrypted data will appear random to anyone who tries to view it. It must be decrypted in order to be recognized. Some encrypted data requires a password to open, while others require an encryption key (aka "key"), which can be used to unlock files associated with the key.

Accordingly, it is known for the server device to transmit encrypted data to the client device. Under this arrangement, the client device has the necessary knowledge or information (e.g. key) to decrypt the encrypted data to obtain clear or unencrypted data. If a third party intercepts (e.g. maliciously) the encrypted data whilst it is in the unsecured channel, the third party will not be able to decrypt the encrypted data because they will not have the key and, therefore, they will only have access to random data. In this way, the information represented by the encrypted data can be obtained via the unsecured channel by the client device, but not by the third party.

There is a continuing need to improve systems and methods for secure data transmission, for example, between a client device and a server device.

SUMMARY OF THE INVENTION

A first aspect of the invention provides a method of secure data transmission within a system comprising a database, a client device, and a server device, the database being in communication with the server device, the server device being in communication with the client device, the method comprising: sending a data request from the client device to the server device, the data request comprising a first share of a first encryption key, and a first location in the database at which is located desired double-encrypted data; receiving the sent data request at the server device; extracting, at the server device, the first share and the first location from the received data request; obtaining, at the server device, the desired double-encrypted data from the database using the extracted first location; generating, at the server device, the first encryption key using the extracted first share and one or more additional shares of the first encryption key held by the server device; decrypting, at the server device, the obtained desired double-encrypted data using the generated first encryption key to form single-encrypted data; sending the single-encrypted data from the server device to the client device; receiving the single-encrypted data at the client device; and decrypting, at the client device, the received single-encrypted data using a second encryption key held by the client device, to form unencrypted data.

In an embodiment, the method further comprises: obtaining, at the client device, a first code corresponding to the desired double-encrypted data; and generating, at the client device, the second encryption key and the first location from the obtained first code.

In an embodiment, the second encryption key is generated by performing a first hash function on the obtained first code.

In an embodiment, the first location is generated by performing a second hash function on the generated second encryption key.

In an embodiment, the method further comprises: obtaining, at the client device, a second code corresponding to the desired double-encrypted data; generating, at the client device, a third encryption key and a second location from the obtained second code, the second location being a location in the database at which is located an encrypted first share of the first code; sending the second location from the client device to the server device; receiving the second location at the server device; obtaining, at the server device, the encrypted first share of the first code from the database using the second location; sending the encrypted first share of the first code from the server device to the client device; receiving the encrypted first share of the first code at the client device; decrypting, at the client device, the encrypted first share of the first code using the third encryption key to obtain an unencrypted first share of the first code; generating, at the client device, the first code from the unencrypted first share of the first code and one or more additional shares of the first code held by the client device.

In an embodiment, the third encryption key is generated by performing a third hash function on the obtained second code.

In an embodiment, the second location is generated by performing a fourth hash function on the generated third encryption key.

In an embodiment, the method further comprises: performing, at the server device, at least one additional hash function on the second location to generate a possible register entry; comparing, at the server device, the possible register entry with stored register entries from a register stored on the database; determining, at the server device, that the possible register entry matches a stored register entry; and aborting, at the server device, communication with the client device based on the stored register entry.

In an embodiment, the method further comprises: determining, at the server device, that security of the second code has been compromised; performing, at the server device, the third hash function on the second code to generate the third encryption key; performing, at the server device, the fourth hash function on the generated third encryption key to generate the second location; and, performing, at the server device, the at least one additional hash function on the generated second location to generate a register entry; storing, by the server device, the register entry in the register stored on the database to indicate that the second code has been compromised and communication should be aborted.

In an embodiment, the second code is received at the client device via an input from a user of the client device.

In an embodiment, the method further comprises: generating, at the client device, a database of the unencrypted data.

In an embodiment, a share of the first encryption key is a share of a secret sharing method.

In an embodiment, the method further comprises: before establishing communication between the server device and the client device, sending from the server device to the client device a request for authentication; receiving the request for authentication at the client device; sending authentication information from the client device to the server device; receiving the authentication information at the server device; comparing, at the server device, the received authentication information with registered authentication information obtained by the server device and associated with the client device; and establishing communication between the server device and the client device only if the received authentication information matches the registered authentication information.

A second aspect of the invention provides a system for secure data transmission, the system comprising: a database having stored thereon double-encrypted data; a server device in communication with the database; and a client device in communication with the server device; the client device being operable to send a data request to the server device, the data request comprising a first share of a first encryption key, and a first location in the database at which is located desired double-encrypted data; the server device being operable to receive the sent data request, extract the first share and the first location therefrom, and then obtain the desired double-encrypted data from the database using the extracted first location, the server device being further operable to generate the first encryption key using the extracted first share and one or more additional shares held by the server device, and then decrypt the obtained desired double-encrypted data using the generated first encryption key to form single-encrypted data; and wherein the server device is operable to send the single-encrypted data to the client device, and the client device is operable to receive the sent single-encrypted data and to decrypt the single-encrypted data using a second encryption key held by the client device to form unencrypted data.

A third aspect of the invention provides a client device for use in a system for secure data transmission, the system comprising a database having stored thereon double-encrypted data, a server device in communication with the database, and the client device in communication with the server device, the client device comprising at least one processor and at least one memory including computer program code, wherein the at least one memory and the computer program code are configured to, with the at least one processor, cause the device to perform at least the following: send a data request to the server device, the data request comprising a first share of a first encryption key, and a first location in the database at which is located desired double-encrypted data; receive single-encrypted data from the server device in response to the sent data request; and decrypt the received single-encrypted data using a second encryption key held by the client device to form unencrypted data.

A fourth aspect of the invention provides a server device for use in a system for secure data transmission, the system comprising a database having stored thereon double-encrypted data and being in communication with the server device, a client device in communication with the server device, and the server device, the server device comprising at least one processor and at least one memory including computer program code, wherein the at least one memory and the computer program code are configured to, with the at least one processor, cause the device to perform at least the following: receive a data request from the client device, the data request comprising a first share of a first encryption key, and a first location in the database at which is located desired double-encrypted data, extract the first share and the first location from the received data request; obtain the desired double-encrypted data from the database using the extracted first location; generate the first encryption key using the extracted first share and one or more additional shares held by the server device; decrypt the obtained desired double-encrypted data using the generated first encryption key to form single-encrypted data; and send the single-encrypted data to the client device.

A fifth aspect of the invention provides a system for secure data transmission, the system comprising: a database for storing thereon double-encrypted data; a server device in communication with the database, the server device being of the fourth aspect; and a client device in communication with the server device, the client device being of the third aspect.

A sixth aspect of the invention provides a computer-readable storage medium having stored thereon computer program code which when executed by a computer causes the computer to execute to following method: sending a data request to a server device, the data request comprising a first share of a first encryption key, and a first location in the database at which is located desired double-encrypted data; receiving single-encrypted data from the server device in response to the sent data request; and decrypting the received single-encrypted data using a held second encryption key to form unencrypted data.

A seventh aspect of the invention provides a computer-readable storage medium having stored thereon computer program code which when executed by a computer causes the computer to execute the following method: receiving a data request from a client device, the data request comprising a first share of a first encryption key, and a first location in a database at which is located desired double-encrypted data, extracting the first share and the first location from the received data request; obtaining the desired double-encrypted data from the database using the extracted first location; generating the first encryption key using the extracted first share and one or more stored additional shares; decrypting the obtained desired double-encrypted data using the generated first encryption key to form single-encrypted data; and sending the single-encrypted data to the client device.

An eighth aspect of the invention provides a method of secure data transmission within a system comprising a database, a client device, and a server device, the database being in communication with the server device, the server device being in communication with the client device, the method comprising: receiving, at the client device, data to be double encrypted; encrypting, at the client device, the received data using a second encryption key held by the client device, to form single-encrypted data; sending an encryption request from the client device to the server device, the encryption request comprising the single-encrypted data and a first share of a first encryption key; receiving the encryption request at the server device; extracting, at the server device, the single-encrypted data and the first share from the received encryption request; generating, at the server device, the first encryption key using the extracted first share and one or more additional shares held by the server device; encrypting, at the server device, the extracted single-encrypted data using the generated first encryption key, to form double-encrypted data; and storing, by the server device, the double-encrypted data at a first location in the database.

A ninth aspect of the invention provides a system for secure data transmission, the system comprising: a database for storing thereon double-encrypted data; a server device in communication with the database; and a client device in communication with the server device; the client device being operable to receive data and to form single-encrypted data by encrypting the received data using a second encryption key held on the client device, the client device being further operable to send an encryption request to the server device, the encryption request comprising the single-encrypted data and a first share of a first encryption key; the server device being operable to receive the sent encryption request, extract the first share and the single-encrypted data therefrom, and then generate the first encryption key using the extracted first share and one or more additional shares held by the server device, the server device being further operable to form double-encrypted data by encrypting the single-encrypted data using the generated first encryption key; and wherein the server device is operable to store the double-encrypted data at a first location in the database.

A tenth aspect of the invention provides a client device for use in a system for secure data transmission, the system comprising a database for storing thereon double-encrypted data, a server device in communication with the database, and the client device in communication with the server device, the client device comprising at least one processor and at least one memory including computer program code, wherein the at least one memory and the computer program code are configured to, with the at least one processor, cause the device to perform at least the following: receive data to be double-decrypted; form single-encrypted data by encrypting the received data using a second encryption key held by the client device; and send an encryption request to the server device, the encryption request comprising the single-encrypted data and a first share of a first encryption key.

An eleventh aspect of the invention provides a server device for use in a system for secure data transmission, the system comprising a database for storing thereon double-encrypted data and being in communication with the server device, a client device in communication with the server device, and the server device, the server device comprising at least one processor and at least one memory including computer program code, wherein the at least one memory and the computer program code are configured to, with the at least one processor, cause the device to perform at least the following: receive an encryption request from the client device, the encryption request comprising single-encrypted data to be double-decrypted, and a first share of a first encryption key, extract the first share and the single-encrypted data from the encryption request; generate the first encryption key using the extracted first share and one or more additional shares held by the server device; form double-encrypted data by encrypting the single-encrypted data using the generated first encryption key; and store the double-encrypted data at a first location in the database.

A twelfth aspect of the invention provides a system for secure data transmission, the system comprising: a database for storing thereon double-encrypted data; a server device in communication with the database, the server device being of the eleventh aspect; and a client device in communication with the server device, the client device being of the tenth aspect.

A thirteenth aspect of the invention provides a computer-readable storage medium having stored thereon computer program code which when executed by a computer causes the computer to execute to following method: receiving data to be double-decrypted; forming single-encrypted data by encrypting the received data using a stored second encryption key; and sending an encryption request to a server device, the encryption request comprising the single-encrypted data and a first share of a first encryption key.

A fourteenth aspect of the invention provides a computer-readable storage medium having stored thereon computer program code which when executed by a computer causes the computer to execute to following method: receiving an encryption request from a client device, the encryption request comprising single-encrypted data to be double-decrypted, and a first share of a first encryption key, extracting the first share and the single-encrypted data from the received encryption request; generating the first encryption key using the extracted first share and one or more stored additional shares; forming double-encrypted data by encrypting the single-encrypted data using the generated first encryption key; and storing the double-encrypted data at a first location in a database.

At least some of the aforementioned further features and advantages of the first aspect are hereby restated in respect of, and are equally applicable to, the second to fourteenth aspects.

BRIEF DESCRIPTION OF THE DRAWINGS

Embodiments of the invention will now be described with reference to the accompanying drawings, wherein like reference signs relate to like components, and in which.

DETAILED DESCRIPTION OF EMBODIMENT(S)

Figure 1:
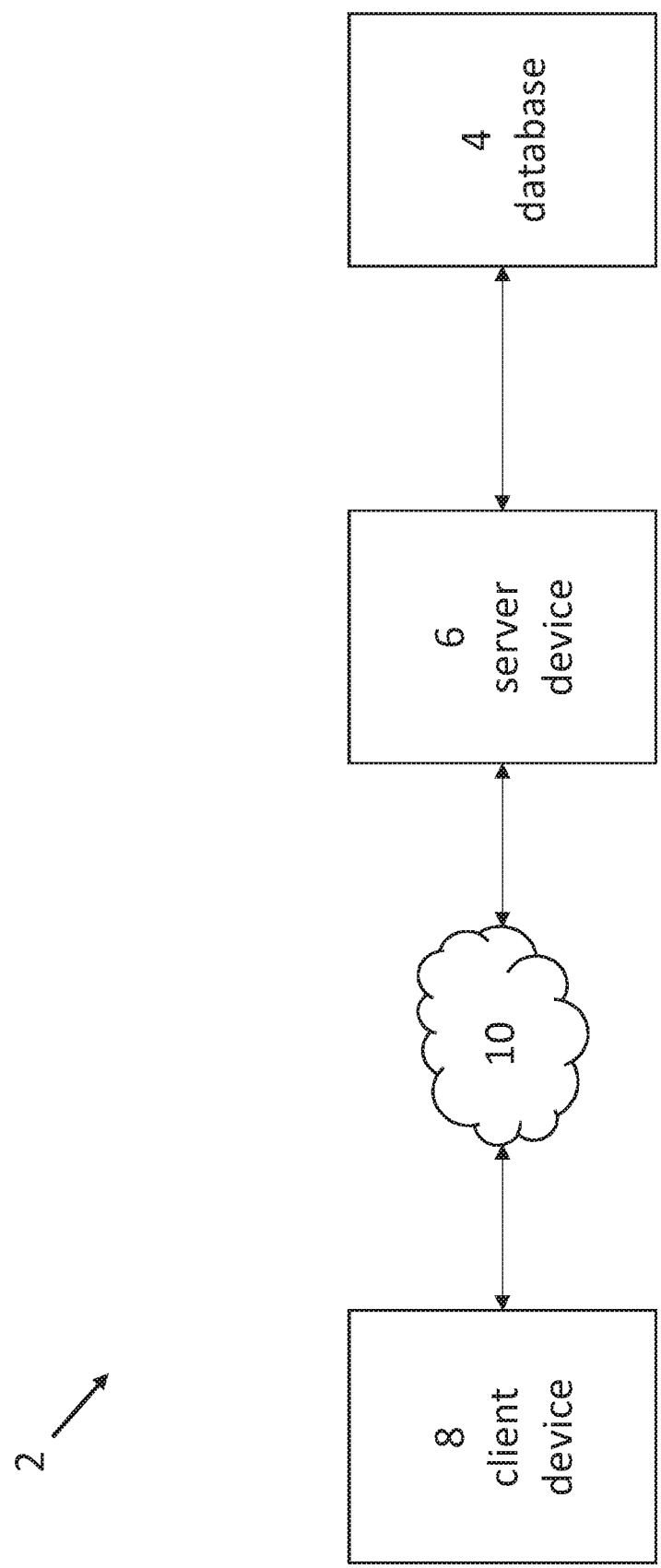
FIG. 1 is a schematic diagram of a system for secure data transmission in accordance with an embodiment.

Some portions of the description which follow are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "sending", "receiving", "generating", "decrypting", "encrypting", "obtaining", "performing", "determining", "aborting", "building", "extracting", "comparing", "establishing" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus (i.e. physical entities) for performing the operations of the methods disclosed herein. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program and the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the invention as defined by the appended claims.

Furthermore, one or more of the steps of the computer program may be performed in parallel rather than sequentially. Such a computer program may be stored on any computer-readable medium. The computer-readable medium may include storage devices such as magnetic or optical disks, memory chips, or other storage devices suitable for interfacing with a general purpose computer. The computer-readable medium may also include a hard-wired medium such as exemplified in the Internet system, or wireless medium such as exemplified in the GSM, GPRS, 3G or 4G mobile telephone systems. The computer program when loaded and executed on such a general-purpose computer effectively results in an apparatus that implements the steps of a method in accordance with an embodiment.

The invention may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Various embodiments of the present invention relate to a methods and systems for secure data transmission.

FIG. 1 is a schematic diagram of a system 2 for secure data transmission. The system 2 may implement a method of secure data transmission. The system 2 comprises a database 4, a server device 6 and a client device 8. The database 4 is in communication with the server device 6. Also, the server device 6 is in communication with the client device 8. It is to be understood that 'in communication with' is intended to include both a 'direct' communication channel between both elements and an 'indirect' communication channel between both elements, an indirect channel being via one or more other elements or networks. Whilst FIG. 1 shows only a single client device in communication with the server device 8, it is to be understood that a plurality of different client devices 6 could be in communication with the server device 6.

In an embodiment, the communication channel between the server device 6 and the database 4 may be secure (aka "secure channel") in the sense that the channel may be resistant to other parties or devices intercepting communications transmitted between the server device 6 and the database 4. For example, the database 4 may be part of the server device 6. Alternatively, the server device 6 may be connected to the database 4 via a hardwired direct communication channel which is not connected to any other devices or parties. On the other hand, the communication channel between the server device 6 and a client device 8 may be unsecured (aka "unsecure channel") in the sense that the channel may be susceptible to other parties intercepting communications transmitted between the server device 6 and the client device 8. For example, as shown in FIG. 1, the server device 6 may be connected to the client device 8 via one or more unsecured networks 10, such as, the Internet. Also, the channel between the client device 8 and the server device 6 may include one or more wireless links which may make interception by third parties (e.g. malicious) easier.

The server device 6 and the client device 8 are each a computer system or a plurality of interconnected computer systems. In this way, the server device 6 and the client device 8 may be provided by a single physical apparatus or distributed across a number of different physical apparatuses. An exemplary computer system is described below with reference to FIG. 7. Additionally or alternatively, the client device 8 may be a wireless computing device, for example, as described below with reference to FIG. 8. In any case, it is to be understood that each of the server device 6 and the client device 8 comprise at least one processor and at least one memory including computer program code, wherein the at least one memory and the computer program code are configured to, with the at least one processor, cause the device to perform a method for secure data transmission, as will be described below with reference to FIGS. 2 to 6.

The database 4 is a structured or organised set of data held in a computer, for example, a computer system is described below with reference to FIG. 7. FIG. 1 shows that the database 4 is separate from the server device 6; however, it is to be understood that in some other embodiments the database 4 may be provided by (e.g. be part of) the server device 6. In an embodiment, the database 4 is any stored structured set of data. For instance, the database 4 may be a structured set of data held in a computer, especially one that is accessible in various ways.

The operation of the system 2 will now be described with reference to FIGS. 2 to 6. However, before considering the embodiments of FIGS. 2 to 6 in detail, the following overview is provided.

In general, the client device 8 sends a request for data to the server device 6. Assuming that the client device 8 requests data which it is permitted to receive (e.g. the client device 8 has the necessary permissions to receive the requested data), the server device 6 retrieves the requested data from the database 4 and then sends it back to the client device 8. However, the following measures are taken in order to ensure that this exchange of data between the client device 8 and the server device 6 is secure such that unauthorised third parties cannot obtain the information conveyed by the transmitted data.

Firstly, data stored on the database 4 and data transmitted between the database 4, the server device 6, and the client device 8 is always in encrypted form. The data is only converted (e.g. decrypted) into unencrypted (aka 'clear') form at the client device 8. Secondly, the means (e.g. keys) required to decrypt the encrypted data into unencrypted data at the client device 8 are part held by the client device 8 and part held by the server device 6—thus no single party has all the means necessary to fully decrypt the encrypted data. Specifically, data which the client device 8 is permitted to receive is stored on the database 4 in double encrypted form, i.e. the data has been encrypted once via a first encryption scheme to form single-encrypted data, and then the single-encrypted data is encrypted a second time via a second encryption scheme (aka "super encryption scheme") to form double-encrypted data (aka "super-encrypted data").

On its own, the client device 8 may not have the means (e.g. keys) to remove (e.g. decrypt) the first encryption scheme or the second encryption scheme. Also, on its own, the server device 6 may not have the means (e.g. keys) to remove (e.g. decrypt) the first encryption scheme or the second encryption scheme. However, the means to remove the first encryption scheme can be generated from data held by the client device 8 and the server device 6. Also, the means to remove the second encryption scheme can be generated from data held by the client device 8 and the server device 6. Therefore, the client device 8 and the server device 6 can work together under a common method for secure data transmission in order to remove both the first and second encryption schemes such that the double-encrypted data is converted into unencrypted data at the client device 8. In this way, data is transmitted in a manner which is secure.

The scheme described above has the following security advantages:

Firstly, if the database 4 is hacked by an unauthorised device, the unauthorised device will only obtain access to stored data which is double encrypted. The unauthorised device will not be able to decrypt the double-encrypted data because the unauthorised device will not have the means (e.g. keys) to remove either the first encryption scheme or the second encryption scheme.

Secondly, if data sent from the database 4 to the server device 6 is intercepted by an unauthorised device, the unauthorised device will only be able to obtain double-encrypted data. The unauthorised device will not be able to decrypt the double-encrypted data because the unauthorised device will not have the means (e.g. keys) to remove either the first encryption scheme or the second encryption scheme.

Thirdly, if the server device 6 is hacked by an unauthorised device, the unauthorised device will only be able to obtain single-encrypted data relating to specific data requests made by the client device 8. That is, the server device 6 does not contain a single-encrypted version of all double-encrypted data stored on the database 4 and, instead, only contains a single-encrypted version of double-encrypted data which is specifically requested by the client device 8 and which the client device 8 is authorised to receive. Moreover, the unauthorised device will not be able to decrypt the single-encrypted data because the unauthorised device will not have the means (e.g. keys) to remove the first encryption scheme.

Fourthly, if the client device 8 is hacked by an unauthorised device, the unauthorised device will only be able to obtain unencrypted data relating to specific data requests made by the client device 8. That is, the client device 8 does not contain an unencrypted version of all double-encrypted data stored on the database 4 and, instead, only contains an unencrypted version of double-encrypted data which is specifically requested by the client device 8 and which the client device 8 is authorised to receive.

In view of the above, secure data transmission is achieved. A more detailed description with reference to FIGS. 2 to 6 now follows.

Figure 2:
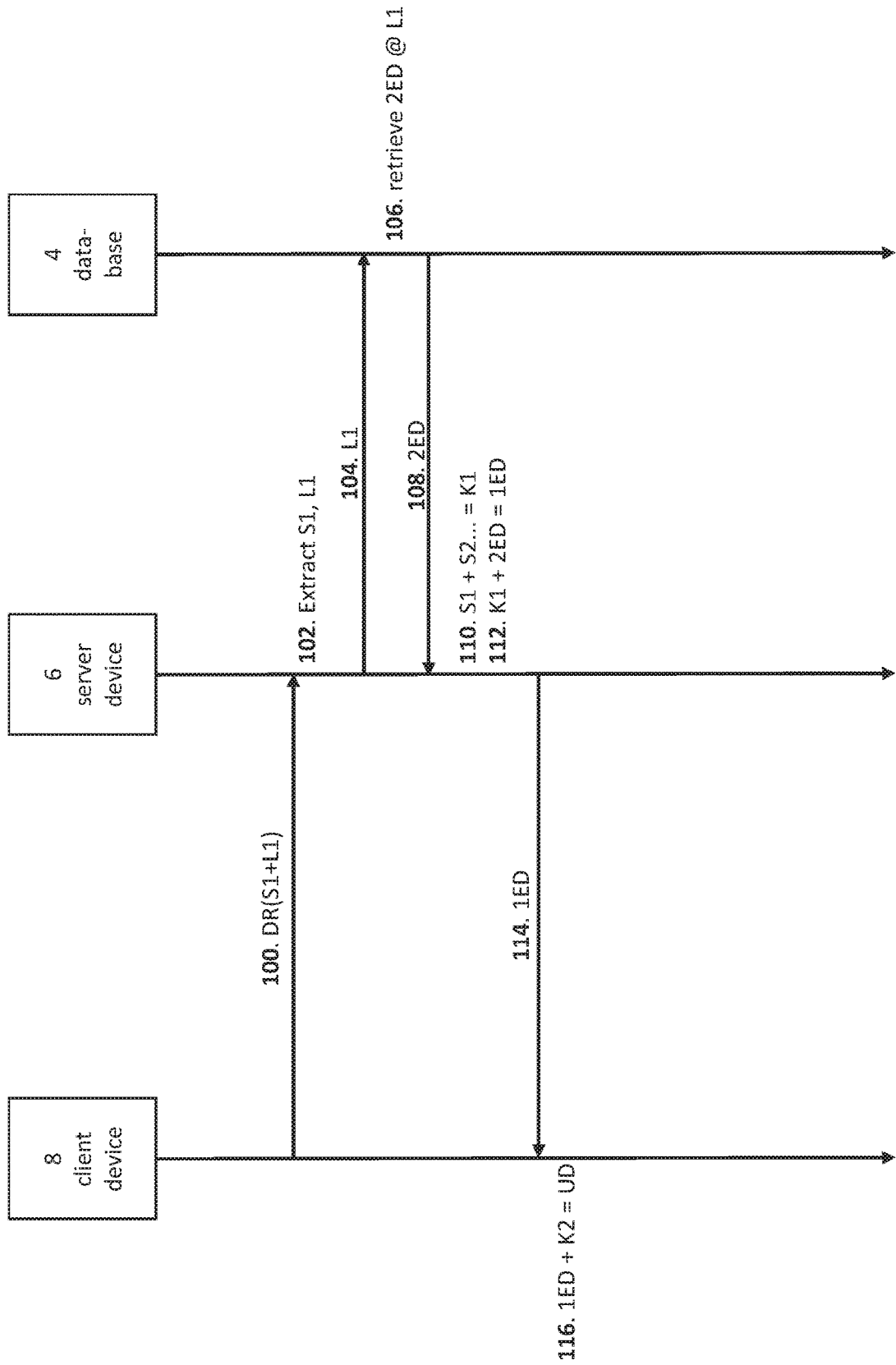
FIG. 2 is a timing diagram illustrating a method for secure data transmission (e.g. decryption) in accordance with an embodiment.

FIG. 2 illustrates a method of secure data transmission between the client device 8, the server device 6 and the database 4, in accordance with an embodiment. In general, the client device 8 sends a request for data to the server device 6. Assuming that the client device 8 requests data which it is permitted to receive, the server device 6 retrieves the requested data from the database 4 and then sends it back to the client device 8. A more detailed explanation of this embodiment now follows with reference to steps 100 to 116.

At step 100, a data request DR is sent from the client device 8 to the server device 6. Generally, the data request DR is a mechanism by which the client device 8 attempts to obtain data which is stored on the database 4, via the server device 6. Specifically, the data request DR includes a first share S1 and a first location L1. The first share S1 is a share of a first encryption key K1. In an embodiment, the first share S1 is a share of a secret sharing method.

"Secret sharing" (aka secret splitting) refers to methods for distributing a secret amongst a group of participants, each of whom is allocated a share of the secret. The secret can be reconstructed only when a sufficient number, of possibly different types, of shares are combined together; individual shares are of no use on their own. Such secret sharing methods would be known to a person skilled in the art.

Numerous secret sharing schemes would be applicable. In an embodiment, an "exor N out of N" scheme may be used. In this example, each of persons A, B and C is provided with a random number, such as, A', B' and C', respectively. When all three persons present their numbers: A', B' and 'C, calculating A' exor B' exor C' provides the secret, wherein 'exor' is bit wise exclusive. Additionally, there are suitable variants of the "exor N out of N" scheme which use linear mathematical functions other than 'exor'. In another example, a "subset of N" scheme may be used. In this other example, 2 out of 3 persons combine their shares, such that not all parties have to combine their shares to calculate the secret. In further examples, other schemes may be used in which the scheme's security is based on computational difficulty rather than the absolute proof available to the N out of N method. In an embodiment, the following schemes may be used: Sharmirs Scheme, Blakley's scheme, Chinese remainder theorem.

Returning to step 100, the first location L1 is a location in the database at which is located desired double-encrypted data 2ED, i.e. data which the client device 8 wants to receive and which has been encrypted twice for security. In an embodiment, the first location L1 is an address within the database 4 or is a pointer to a location within the database 4.

At step 102, the data request DR is received by the server device 6 and the first share S1 and the first location L1 are extracted therefrom. At steps 104 to 108, the server device 6 obtains the desired double-encrypted data 2ED from the database 4 using the extracted first location L1. That is, the server device 6 obtains the data stored at L1 in the database 4.

At step 110, the server device 6 generates the first encryption key K1 using the extracted first share S1 and one or more additional shares S2 . . . of the first encryption key K1 held by the server device 6. In an embodiment, three shares are used. The first share S1 is received by the server device 6 from the client device 8, as described above. This share may be referred to as the client share. A second share S2 is stored by the server device 6 and may be referred to as the server share. A third share S3 is received by the server device 6 from an external device. For example, the external device may controlled by an owner of the server device 6 or may be controlled by a third party, such as a third party authentication service. This third share may be referred to as the owner share. It is to be understood that in different embodiments more or less than three shares may be used, for example, two or four shares may be used. In any case, at step 110, the server device 6 generates the first encryption key K1 from the first share S1 and the one or more additional shares.

At step 112, the server device 6 decrypts the double-encrypted data 2ED using the first encryption key K1 in order to form single-encrypted data 1ED. That is, the second encryption scheme (aka super encryption scheme) applied to the double-encrypted data is decrypted by the first encryption key. As such, the first encryption key K1 may be a super encryption key. It is noted that the double-encrypted data 2ED and the single-encrypted data 1ED both include the desired data which the client device 8 has requested. However, in the case of the double-encrypted data 2ED, this desired data has been encrypted twice, whereas in the case of the single-encrypted data 1ED, this desired data has been encrypted once.

At step 114, the server device 6 sends the single-encrypted data 1ED to the client device 8. At step 116, the client device 8 receives the single-encrypted data 1ED and decrypts the single encrypted data 1ED using a second encryption key K2 which is held (e.g. stored) by the client device 8. As such, the client device 8 decrypts the single-encrypted data 1ED to form unencrypted data UD. In an embodiment, the client device 8 may generate and maintain a database of the unencrypted data at the client device 8. It is noted that the unencrypted data is the desired data which the client device 8 requested in step 100 via the data request DR.

In view of the above, the client device 8 sends a data request DR to the server device 6 for double-encrypted data 2ED. The server device 6 retrieves the double-encrypted data 2ED from the database 4. If the client device 8 is authorised to receive the double-encrypted data 2ED, the share S1 received by the server device 6 from the client device 8 will combine with one or more other shares S2 . . . held by the server device 6 to form a first encryption key K1 which can be used by the server device 6 to remove the second encryption scheme applied to the double-encrypted data 2ED to form single-encrypted data 1ED. The single-encrypted data 1ED is then sent back to the client device 8 so that it can be decrypted at the client device 8 via the second encryption key K2 to form unencrypted data UD.

During the above process, data is only transmitted in encrypted form, i.e. 2ED and 1ED. Also, unencrypted data can only be obtained at the client device 8 if the client device 8 and server device 6 work together. Neither the client device 8 alone nor the server device 6 alone can decrypt the double encrypted data 2ED to form unencrypted data UD.

Also, if the client device 8 is not authorised to receive the double encrypted data 2ED, then the clients share S1 combined with the one or more other shares S2 . . . will not form the first encryption key and, therefore, the combination will not remove the second encryption scheme applied to the double-encrypted data 2ED to form single-encrypted data 1ED. In turn, the decryption performed at the client device 8 using the second decryption key will not yield unencrypted data.

In view of the above, secure data transmission between the client device 8 and the server device 6 is achieved.

Figure 3:
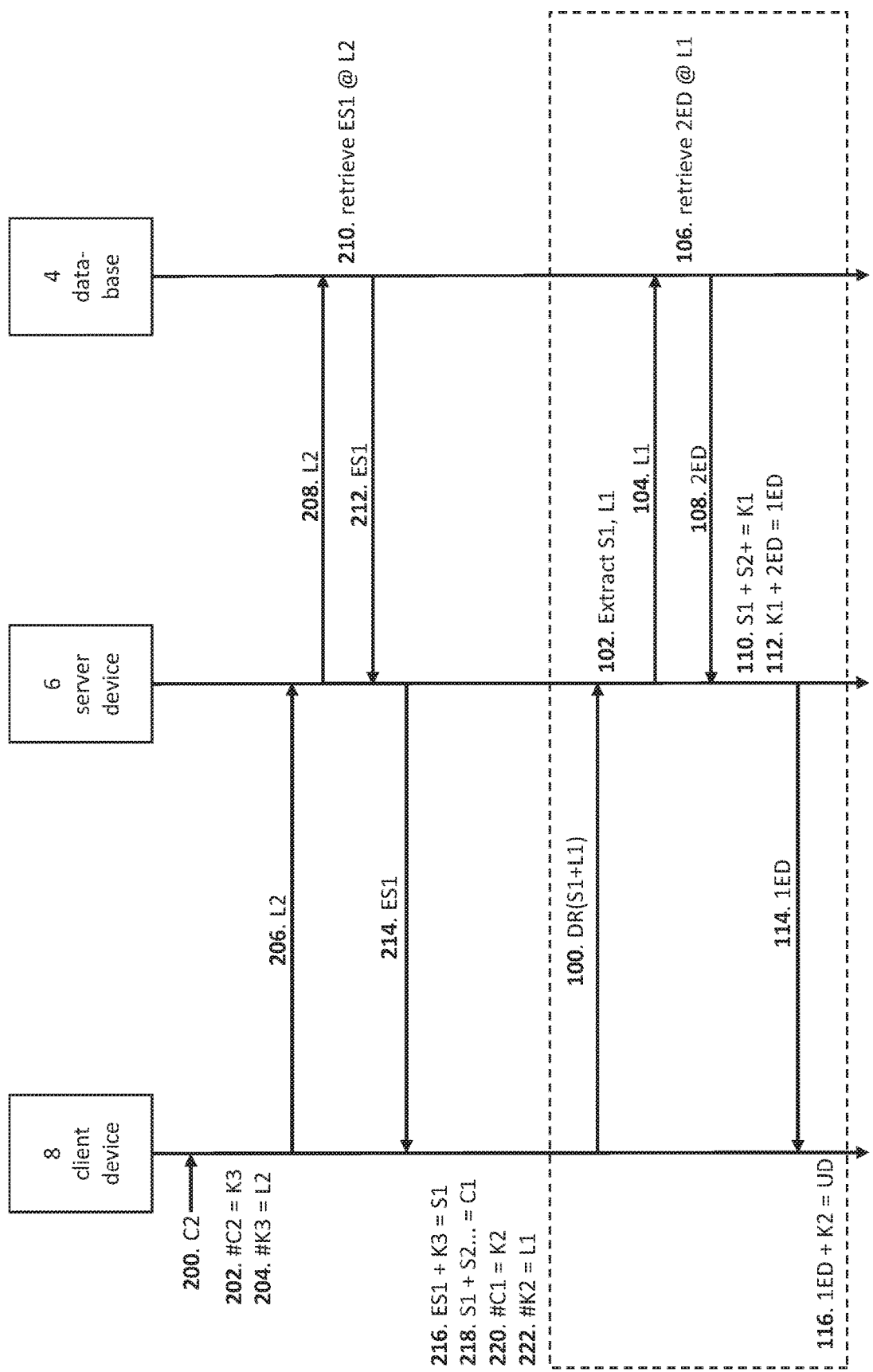
FIG. 3 is a timing diagram illustrating a variant to the method of FIG. 2.

FIG. 3 illustrates a variant to the method of secure data transmission of FIG. 2. As seen in FIG. 3, the area inside a dashed line box (i.e. steps 100 to 116) is the same as FIG. 2. Accordingly, the following describes the new portions of FIG. 3, i.e. the area outside the dashed line box—steps 200 to 222.

In general, the new portions of FIG. 3 illustrate a mechanism by which the client device 8 obtains the second encryption key K2 which was used in step 116 described above. Generally, the second encryption key K2 is generated by performing cryptographic hash functions on a first code, and the first code is generated by performing cryptographic hash functions on a second code. Additionally, the first code is generated from the second code via an exchange of data between the client device 8, the server device 6, and the database 4. Also, the first and second codes represent (e.g. are associated with) the double-encrypted data 2ED. A more detailed explanation now follows.

At step 200, the client device 8 obtains the second code C2. In an embodiment, the second code is received at the client device 8 via an input from a user of the client device 8. For example, the client device 8 may be a wireless or mobile computing device, such as, as described below with reference to FIG. 8. In any case, the client device 8 may include various input mechanisms, such as, for example, a touchscreen, a keyboard, a scanning device, or image capture device. One or more of these input mechanisms may be used to input the second code into the client device 8. In one specific embodiment, the client device 8 has a scanning device which is capable of reading a barcode, such as, a matrix barcode or quick response (QR) code. As would be known to a person skilled in the art, a barcode is a machine readable optical label that contains information. Often the information relates to an item to which the barcode is attached. In the present case, the barcode contains the second code C2. As such, the act of using the client device 8 to read the barcode inputs the second code onto the client device 8. It is to be understood that in different embodiments other mechanisms could be used to input the second code C2 into the client device 8.

At steps 202 and 204, the second code C2 is used to generate a third encryption key K3 and a second location L2 at the client device 8. The second location L2 is a location in the database 4 at which is located an encrypted first share ES1 of the first code C1. As before, the second location L2 is an address within the database 4 or is a pointer to a location within the database 4. Also, the encrypted first share ES1 is an encrypted share of a secret sharing method.

In an embodiment, at step 202, a cryptographic hash function (hereinafter called "third hash function") is performed on the second code C2 in order to generate the third encryption key K3. Also, in an embodiment, at step 204, another cryptographic hash function (hereinafter called "fourth hash function") is performed on the third encryption key K3 in order to generate a second location L2. Both the third and fourth hash functions are held by (e.g. stored on) the client device 8.

As would be known to a person skilled in the art, a cryptographic hash function is a special class of hash function that has certain properties which make it suitable for use in cryptography. A cryptographic hash function is a mathematical algorithm that maps data of arbitrary size to a bit string of a fixed size (a hash) and is designed to be a one-way function, that is, a function which is infeasible to invert.

There are numerous hash functions which would be applicable, for example, that have a suitable bit wise fixed length property and good anti-collision properties. For example, suitable hash functions are: Cubehash, GOST, MD2, MD4, MD5, MD6, and RIPEMD. MD5 is the best known for its use by disk operating systems (DOS) to both index files on a disk and protect data files against bit errors. However, if hash functions are to be used to compute/derive keys they must be cryptographically strong. A cryptographic hash function is cryptographically strong if it has excellent anti-collision properties and its irreversibility property is strong. Strength may be measured by mathematical resistance to the following attacks: exhaust/brute-force, extension, birthday, rainbow, collision, etc. In this respect, particularly suitable hash functions may be those publicly approved by expert government bodies such as the USA's National Security Agency (NSA) or the UK's Government Communications Head Quarters (GCHQ). For example, particularly suitable hash functions may include: SHA-2 family (SHA-224, 256, 384, and 512); SHA-3 family (SHA3-224, 256, 384, and 512); SHAKE family (SHAKE-128 and 256); and, SHA-2 and SHA-3 384 and 512. Also, in some embodiments, the hash function may include a "secret". Hash with secret or a shared secret is a state of the art method for ensuring that only the authorised may successfully compute the hash. A keyed-HMAC used to produce Hash message authentication codes is an example of hashing with a secret.

However, it is to be understood that in some other embodiments, the third encryption key K3 and the second location L2 may be generated from the second code C2 without the use of hash functions.

At step 206, the client device 8 sends the second location L2 to the server device 6. At steps 208-214, the server device 6 retrieves the encrypted first share ES1 stored in the database 4 at the second location L2, and then sends the encrypted first share ES1 back to the client device 8. It is noted that the encrypted first share ES1 is encrypted, for example, single-encrypted, i.e. encrypted by a single encryption scheme.

At step 216, the client device 8 receives the encrypted first share ES1 and uses the third encryption key K3 (generated at step 202) to decrypt the encrypted first share ES1 to form an unencrypted first share S1 of the first code C1. At step 218, the client device 8 generates the first code C1 using the first share and one or more extra shares S2 . . . of the first code C1. The one or more extra shares S2 . . . are held (e.g. stored) by the client device 8. As before, in an embodiment, three shares may be used—a client share, a server share, and an owner share.

At steps 220 and 222, the first code C1 is used to generate the second encryption key K2 (used in step 116) and the first location L1 (used in steps 100 and 106). In an embodiment, at step 220, a cryptographic hash function (hereinafter called "first hash function") is performed on the first code C1 in order to generate the second encryption key K2. Also, in an embodiment, at step 222, another cryptographic hash function (hereinafter called "second hash function") is performed on the second encryption key K2 in order to generate the first location L1. In an embodiment, the first and third hash functions are the same. Also, in an embodiment, the second and fourth hash functions are the same. However, it is to be understood that in some other embodiments, the second encryption key K2 and the first location L1 may be generated from the first code C1 without the use of hash functions.

As shown in FIG. 3, once the first location L1 and the second encryption key K2 have been generated, the processing of FIG. 3 can proceed as per the processing of FIG. 2, as described above.

As mentioned, the second code C2 represents the double encrypted data 2ED meaning that the second code can be used to obtain the double-encrypted data 2ED via the aforementioned method of FIG. 3. However, the double-encrypted data 2ED is not directly identifiable from the second code C2 since it is a code (e.g. a system of words, letters, figures, or symbols used to represent others, especially for the purposes of secrecy). Therefore, the second code C2 can be insecurely (e.g. publically) distributed to the client device 8 because, even if a third party obtains the second code C2, the third party will not know the means (e.g. the third and fourth hash functions) required to generate the second location L2. Therefore, the third party will not be able to request that the server device 6 obtains database data stored at the second location L2. Moreover, even if a third party intercepts the encrypted first share ES1, the third party will not know the extra shares S2 . . . or have the means (e.g. the first and second hash functions) required to generate the second encryption key K2 and the first location L1.

In further embodiments additional processing steps may occur that facilitate the secure storage of server device metadata, for example to allow other data or system management functions to be performed. In particular, at step 208 the server device 6 may perform an additional cryptographic hash function on the second location L2 to generate a revised location L2#, the second location L2 then being used as a further key to encrypt the server device's metadata. The encrypted metadata is appended to the encrypted client data (ES1) and sent to the database 4 and subsequently stored using the revised location L2# instead of the un-hashed second location L2.

Alternatively, to secure server device metadata the server device 6 may perform an additional cryptographic hash function at step 102 on the first location L1 to calculate a revised location L1#, the first location L1 then used as another further key to encrypt the server device's metadata. The encrypted metadata is appended to the encrypted client data (2ED) and sent to the database 4 and subsequently stored using the revised first location L1# instead of the un-hashed first location L1.

In addition, since the method of FIG. 3 also includes the above-described method of FIG. 2, the security features and advantages described above with reference to FIG. 2 are equally applicable to the method of FIG. 3.

Figure 4:
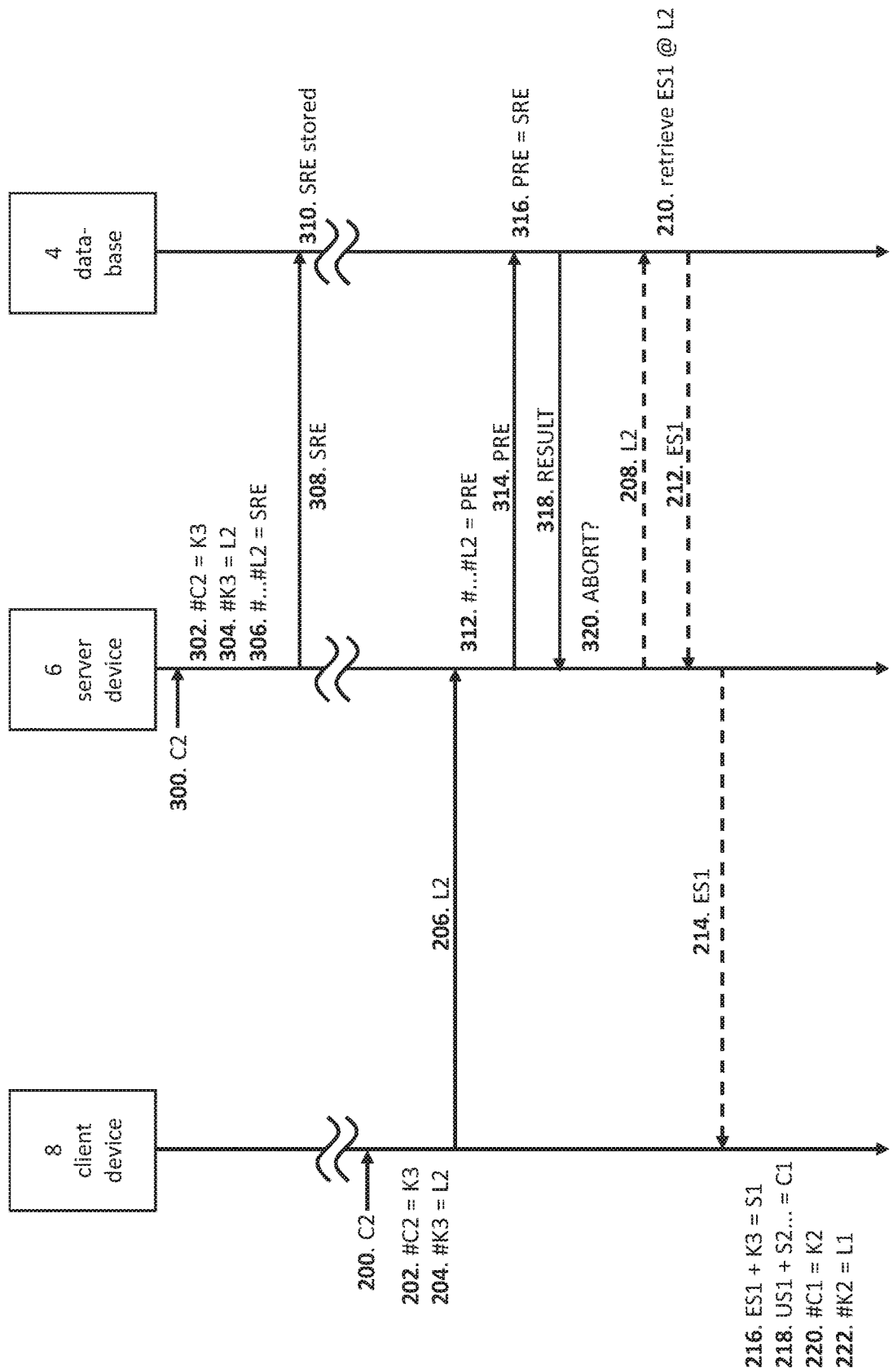
FIG. 4 is a timing diagram illustrating another variant to the method of FIG. 2.

FIG. 4 illustrates a variant to FIG. 3. The parts of FIG. 4 taken from FIG. 3 can be identified since they have the same reference signs as used in the above description (i.e. 200 to 222). The parts of FIG. 4 which are new can be identified by reference signs 300 to 320.

In general, the new portions of FIG. 4 illustrate a mechanism by which attributes or metadata can be associated with the second code. For example, where a particular second code is known to have been compromised, an attribute of the second code can be configured such that the server device 6 aborts communication with a client device 8 when that client device 8 attempts to use the second code to retrieve the double-encrypted data represented by the second code. In this way, security is improved. In an example, a second code may be compromised if it is known that a malicious third party has tried to use the second code in order to gain unauthorised access to the double-encrypted data represented by that second code. Additionally or alternatively, a second code may be compromised as a result of a hashing collision (e.g. 'hash collision attack'). A hashing collision occurs when two different input strings of a hash function produce the same hash result. Because hash functions have infinite input length and a predefined output length, there is inevitably going to be the possibility of two different inputs that produce the same output hash. A hashing collision can also compromise security.

A full description of FIG. 4 now follows.

At step 300, a determination is made that a particular second code C2 has been compromised. Accordingly, the server device 6 receives the second code C2 with a notification that it has been compromised. This information may be sent from another device under the control of the same entity which controls the server device 6 and database 4. Alternatively, this information may be received from a third party device which has become aware of an attempted or actual security breach, or of a hashing collision. In any case, at step 300, the server device 6 determines that security of the second code C2 has been compromised.

At step 302, the server device 6 performs a cryptographic hash function on the second code C2. This is the same cryptographic hash function which was performed in above step 202, i.e. the third hash function. Accordingly, as in step 202, at step 302, the result of the hash function is the generation of the third encryption key K3.

At step 304, the server device 6 performs a cryptographic hash function on the third encryption key K3. This is the same cryptographic hash function which was performed in above step 204, i.e. the fourth hash function. Accordingly, as in step 204, at step 304, the result of the hash function is the generation of the second location L2.

At step 306, one or more additional hash functions are performed on the second location L2 to generate a register entry SRE for storage on the database 4. In an embodiment, the one or more additional hash functions include at least two hash functions. Each hash function of the one or more hash functions may be the same or different to the first to fourth hash functions mentioned above.

At steps 308 and 310, the server device 6 stores the register entry SRE on the database 4. Specifically, the register entry SRE is stored in a register which is stored on the database 4. In an embodiment, the mere storage of the SRE on the register indicates that the associated second code C2 is compromised. In another embodiment, the SRE is stored with associated metadata which may provide further details of the compromise, and/or may include one or more instructions for the server device 6 to perform in the event that the second code C2 is used by a client device.

As indicated on FIG. 4 by the parallel wavy lines, the processing flow from step 310 to step 200 may happen immediately, but may also include a delay of time (e.g. minutes, hours, days, weeks or years). In any case, at some point after the register entry SRE has been stored in the register on database 4, the processing of above-mentioned steps 200 to 206 occurs as described above with reference to FIG. 3. At step 206, the second location L2 is sent from the client device 8 to the server device 6. On receipt of the second location L2, the server device 6 performs the same one or more additional hash functions which were performed in step 306 in order to generate a possible register entry PRE from the second location L2.

At steps 314 to 318, the server device 6 checks the register stored on the database 4 to see if the possible register entry PRE matches any of the register entries SRE stored in the register. If based on this comparison no match is found, the processing proceeds with steps 208 to 222 as described above with reference to FIG. 3. For instance, on detecting no match, the RESULT of step 318 indicates that no match has been found. However, in the event that the possible register entry PRE matches a stored register entry SRE, processing does not proceed with steps 208 to 222. Instead, on determining the match, at step 320, the server device 6 aborts all communication with the client device 8 based on the match. In an embodiment, the mere detection of a match may cause the server device 6 to abort communication with the client device 8. For example, the RESULT of step 318 indicates that a match exists and this causes the server device 6 to abort communication with the client device 8 at step 320. In another embodiment where metadata is stored with the stored register entry SRE, and the server device 6 may proceed in accordance with instructions, notifications or flags contained in the metadata (and returned in the RESULT of step 318). For example, the metadata may include an abort flag, and the server device 6 may only abort if the abort flag of the stored register entry SRE is set. Alternatively, the metadata may instruct the server device 6 to perform one or more further operations to determine the authenticity of the client device 8, and the server device 6 may abort communication with the client device 8 only if this authentication process fails. In any case, if the server device 6 aborts communication with the client device 8 at step 320 then steps 208 to 222 are not performed, as indicated by the fact that steps 208, 212 and 214 are shown with dashed lines.

Based on the above, the database 4 contains a register which indicates when certain second codes C2s have been compromised. The server device 6 can then use this register to check a second code C2 received from a client device 8 before returning any data to that client device 8. For example, where the register does not indicate that a second code C2 has been compromised, communication between the server device 6 and the client device 8 can proceed as described above with reference to FIG. 3. On the other hand, where the register does indicate that a second code C2 has been compromised, communication between the server device 6 and the client device 8 can be stopped as described with reference to FIG. 4.

According to the above description of FIG. 4, a mechanism is described in which an attribute of a compromised second code can be configured such that the server device 6 aborts communication with a client device 8 when that client device 8 attempts to use the compromised second code to retrieve the double-encrypted data. In this way, security is improved. However, it is to be understood that in at least some embodiments, this mechanism can additionally or alternatively be applied to one or more data elements other than the second code, for example, any data element generated for the purpose of establishing keys, e.g. C1, C2, S1, S2, S3, etc. For instance, when one of these data elements is generated for the first time, the data element may be registered in the database register (analogously to steps 300 to 310). Subsequently, the data element may be checked for compromise (analogously to steps 312 to 320). In this way, compromise protection may be provided across the full key management security model at all levels, for example, physical data/machine/human/and logical user/owner levels.

Figure 5:
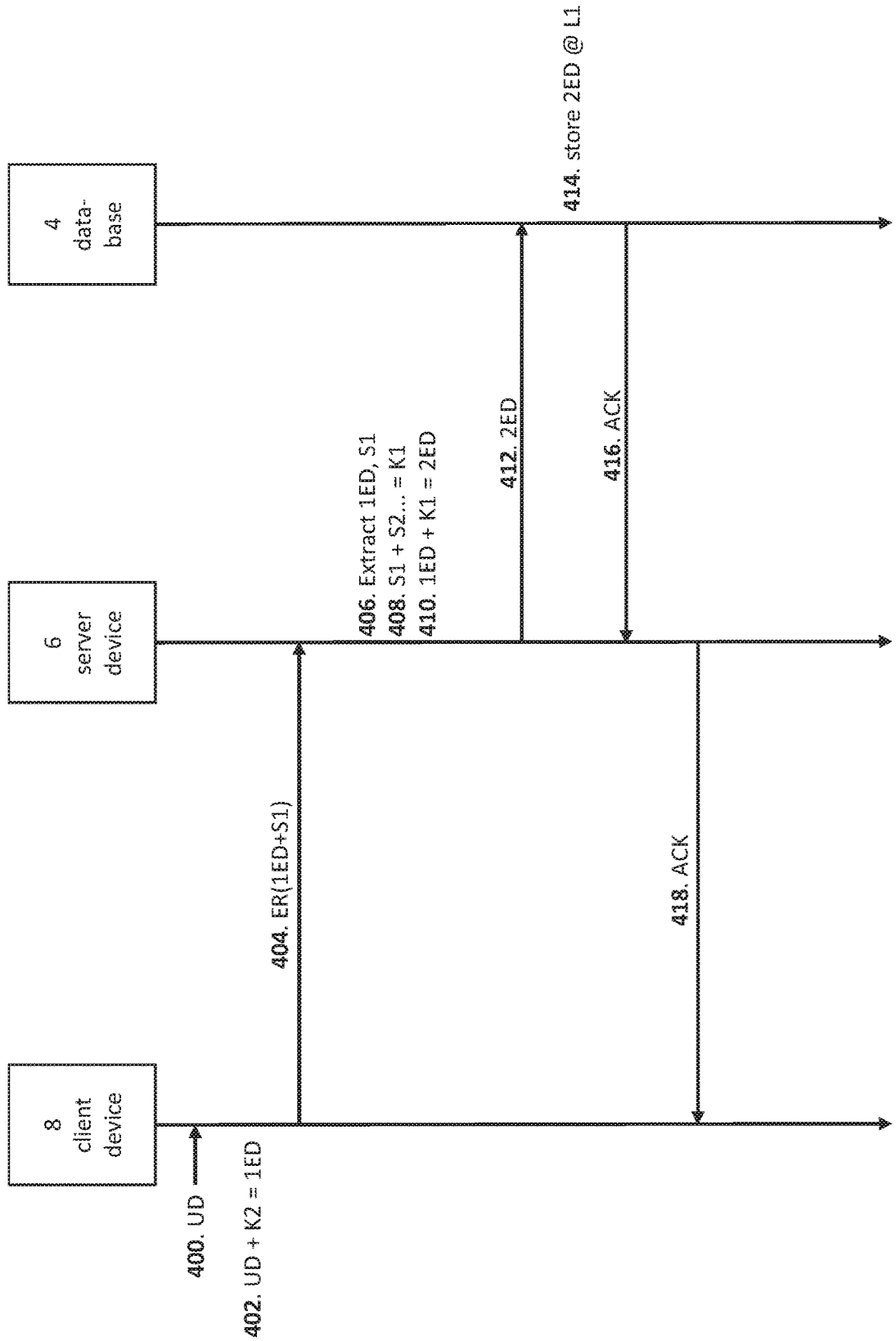
FIG. 5 is a timing diagram illustrating a method for secure data transmission (e.g. encryption) in accordance with another embodiment.

FIG. 5 illustrates an encryption method which corresponds to the decryption method of FIGS. 2 to 4.

At step 400, the client device 8 obtains unencrypted data UD to be double encrypted into 2ED. The unencrypted data UD may be generated by the client device 8 or may be generated elsewhere and received by the client device 8. It is noted that the unencrypted data UD is to be encrypted into double-encrypted data 2ED in such a way that the client device 8 and the server device 6 will have to interact, as described above, in order to retrieve the information conveyed by the double-encrypted data 2ED.

At step 402, the unencrypted data UD is encrypted by a second encryption key K2 stored on the client device 8 in order to form single-encrypted data 1ED. The second encryption key K2 may be the same second encryption key K2 as described above with reference to FIGS. 2 to 4.

At step 404, the client device 8 sends an encryption request ER to the server device 6. The encryption request ER contains the single-encrypted data 1ED and a first share S1 of a first encryption key K1. As before, in an embodiment, the first share S1 is a share of a secret sharing method, specifically, the first share S1 may be the client share. The first encryption key K1 may be the same first encryption key K1 as described above with reference to FIGS. 2 to 4.

At step 406, the server device 6 receives that encryption request ER and extracts the single-encrypted data 1ED and the first share S1 of the first encryption key K1. At step 408, the server device 6 generates the first encryption key K1 using the extracted first share S1 and one or more additional shares S2 . . . stored by the server device 6. In an embodiment, the one or more additional shares S2 . . . are shares of the same secret sharing method as S1. In an embodiment, three shares are used. The first share S1 is received by the server device 6 from the client device 8, as described above. This share may be referred to as the client share. A second share S2 is stored by the server device 6 and may be referred to as the server share. A third share (e.g. owner share) S3 is received by the server device 6 from an external device. For example, the external device may controlled by an owner of the server device 6 or may be controlled by a third party, such as a third party authentication service. In any case, at step 408, the server device 6 generates the first encryption key K1 from the first share S1 and the one or more additional shares S2 . . . .

At step 410, the server device encrypts the single-encrypted data 1ED using the first encryption key K1 in order to generate the double-encrypted data 2ED. At steps 412 and 414, the server device 6 stores the double-encrypted data 2ED on the database 4 at a first location L1. Subsequently, the database 4 may issue an acknowledgement back to the server device 6 (step 416), and the server device 6 may issue an acknowledgement back to the client device 8 (step 418), to confirm that the data has been stored on the database 4 successfully. In an embodiment, the first location L1 is an address within the database 4 or is a pointer to a location within the database 4. The first location L1 may be the same first location L1 as described above with reference to FIGS. 2 to 4.

Based on the above steps 400 to 418, data can be securely stored on the database 4. In particular, the aforementioned security advantages can be obtained because the decryption methods of FIGS. 2 to 4 are required to obtain the unencrypted data UD back at the client device 8.

It is to be understood that the aforementioned mechanism of FIG. 4, for aborting communication between the client 8 and server 6 when a data element (e.g. C1, C2, S1, S2, S3) is compromised, is equally applicable to the encryption technique of FIG. 5. In this way, security is improved. For example, when a data element (e.g. S1, S2, and S3) is generated for the first time, the data element may be registered in the database register (analogously to steps 300 to 310). Subsequently, the data element may be checked for compromise (analogously to steps 312 to 320).

Figure 6:
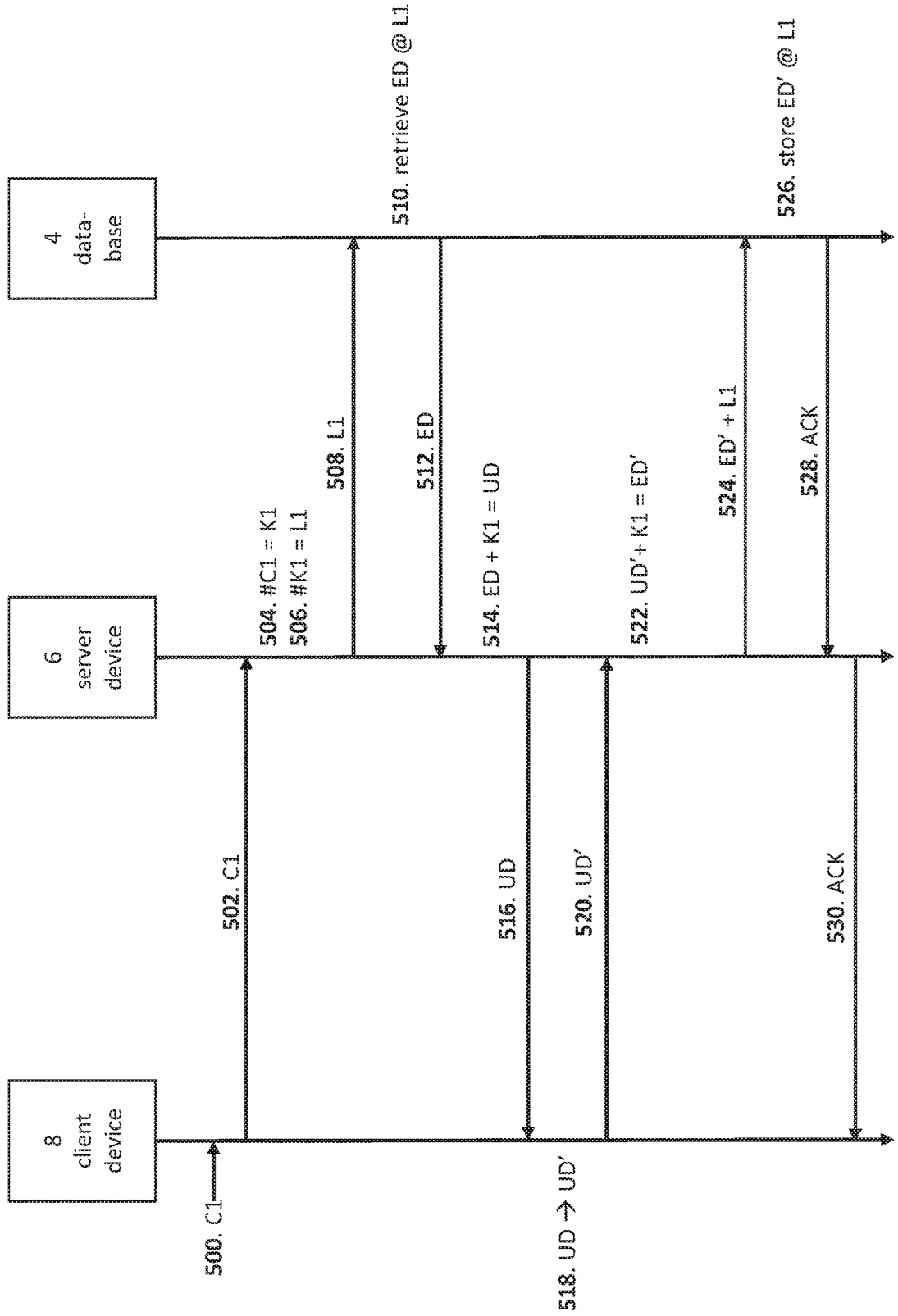
FIG. 6 is a timing diagram illustrating a method for secure data transmission (e.g. decryption and encryption) in accordance with a further embodiment.

FIG. 6 illustrates a method of secure data transmission (e.g. decryption and encryption) between the client device 8, the server device 6 and the database 4, in accordance with another embodiment. As was the case with the embodiments of FIGS. 2 to 4, in general, the client device 8 sends a request for data to the server device 6. Assuming that the client device 8 requests data which it is permitted to receive, the server device 6 retrieves the requested data from the database 4 and then sends it back to the client device 8.

At step 500, the client device 8 obtains a first code C1. The first code C1 represents encrypted data ED which is stored on the database 4. In this way, the first code C1 provides a mechanism by which the client device 8 can request and obtain the encrypted data ED from the database 4 via the server device 6.

In an embodiment, the first code C1 is received at the client device 8 via an input from a user of the client device 8. For example, the client device 8 may be a wireless or mobile computing device, such as, as described below with reference to FIG. 8. In any case, the client device 8 may include various input mechanisms, such as, for example, a touchscreen, a keyboard, a scanning device or image capture device. One or more of these input mechanisms may be used to input the first code C1 into the client device 8. In one specific embodiment, the client device 8 has a scanning device which is capable of reading a barcode, such as, a matrix barcode or quick response (QR) code. As would be known to a person skilled in the art, a barcode is a machine readable optical label that contains information. In the present case, the barcode contains the first code C1. As such, the act of using the client device 8 to read the barcode inputs the first code C1 onto the client device 8. It is to be understood that in different embodiments other mechanisms could be used to input the first code C1 into the client device 8.

In an embodiment, the first code C1 is a world-wide unique identifier (WWUID) uniform resource location (URL). The act of inputting the first code C1 into the client device 8 transfers the WWUID URL to a web browser of the client device 8. The browser then uses the URL to create a hypertext transfer protocol secure (HTTPS) service to the server device 6. Then, the browser transfers the WWUID to the server device 6 via the HTTPS service.

At step 502, the client device 8 sends the first code C1 to the server device 6. At step 504, the server device 6 performs a cryptographic hash function (hereinafter called "first hash function") on the first code C1 in order to generate a first encryption key K1. At step 506, another cryptographic hash function (hereinafter called "second hash function") is performed on the first encryption key K1 in order to generate a first location L1. The first location L1 is a location in the database 4 at which is located encrypted data ED represented by the first code C1. The first location L1 is an address within the database 4 or is a pointer to a location within the database 4. The first and second hash functions are stored on the server device 6.

At steps 508 to 512, the server device 6 uses the first location L1 to obtain the encrypted data ED stored at location L1 in the database 4. At step 514, the server device 6 uses the first encryption key K1 (generated at step 504) to decrypt the encrypted data ED to form unencrypted (or clear) data UD. At step 516, the server device 6 sends the unencrypted data UD back to the client device 8.

Based on the above, the client device 8 can receive the first code C1 which represents the encrypted data ED. However, the encrypted data ED cannot be obtained solely from the first code C1. Instead, the first code C1 can be sent to the server device 6 which can use the first code C1 to generate an encryption key K1 which can be used to decrypt the encrypted data ED to form unencrypted data UD. It is noted that neither the client device 8 nor the server device 6 can decrypt the encrypted data ED alone. For instance, the client device 8 does not know the hash function required to generate the encryption key K1. Also, the server device 6 does not know the first code C1 required to generate the encryption key K1.

Steps 518 to 530 illustrate a process for updating the data at the client device 8 and storing the updated data back on the database 4 using the server device 6. Specifically, at step 518, the unencrypted data UD is updated at the client device 8 to form updated unencrypted data UD'. For example, a human operator of the client device 8 may use input devices (e.g. a keyboard or a touchscreen) of the client device 8 to update the data. At step 520, the updated unencrypted data UD' is sent from the client device 8 to the server device 6. At step 522, the server device 6 receives the updated unencrypted data UD' and, using the first encryption key K1, generates updated encrypted data ED'. At steps 524 and 526, the server device 6 stores the updated encrypted data ED' at the first location L1 in the database 4. In another embodiment, the updated encrypted data ED' may be stored at a databased location other than L1. Subsequently, the database 4 may issue an acknowledgement back to the server device 6 (step 528), and the server device 6 may issue an acknowledgement back to the client device 8 (step 530), to confirm that the data has been stored on the database 4 successfully.

In the above-described embodiments, data is transmitted from the server device 6 to the client device 8, and vice versa. In at least some embodiments, before the server device 6 will receive data from the client device 8, the client device 8 must authenticate itself. Additionally or alternatively, before the server device 6 will transmit data to the client device 8, the client device 8 must authenticate itself. For example, the client device 8 may have to authenticate itself before one or more of the following steps can be performed: 100, 114, 206, 214, 404, 418, 502, 516, 520, and 530. Various authentication techniques (e.g. human to machine authentication, or machine to machine authentication) would be known to the skilled person and would be suitable for use in this application. For example, the client device 8 (or a human user thereof) may have to register certain authentication information (e.g. username and password) with the server device 6. Then, before each time the client device 8 sends and receives data to/from the server device 6, the server device 6 may prompt the client device 8 to authenticate itself or to input authentication information. Then, communication between the server device and the client device can continue only if the server device 6 verifies the input authentication information as authentic. In some other embodiments, instead of a username and password, other authentication information could be used, such as, biometric information (e.g. fingerprint, voice print, retinal scan, facial scan), a cryptographic key, or an identification badge.

In an example authentication, before communication between the server device and the client device is established, the server device sends to the client device a request for authentication. On receipt of the request, the client device sends back authentication information to the server device. The server device then obtains registered authentication information relating to, or associated with, the client device. For example, the client device may have had to register the authentication information in advance. The registered authentication information may be stored by the server device or the database or sent to the server device from elsewhere. In any case, the server device compares the received authentication information with the registered authentication information and establishes communication between the server device and the client device only if the received authentication information matches the registered authentication information. It is to be understood that authentication could happen once at the first time the client device seeks to communicate with the server device. Alternatively, authentication could happen each time the client device seeks to communicate (e.g. send or receive data) with the server device. In further embodiments, a situation midway between these two extremes could exist.

As mentioned above, the devices and databases of the above-described embodiments may be a computer system. Additionally, the devices and databases of the above-described embodiments may be a plurality of interconnected computer systems. In this way, each device or database may be provided by a single physical apparatus or may be distributed across a number of different physical apparatuses, perhaps in different geographical locations. An exemplary computer system is described below with reference to FIG. 7.

Figure 7:
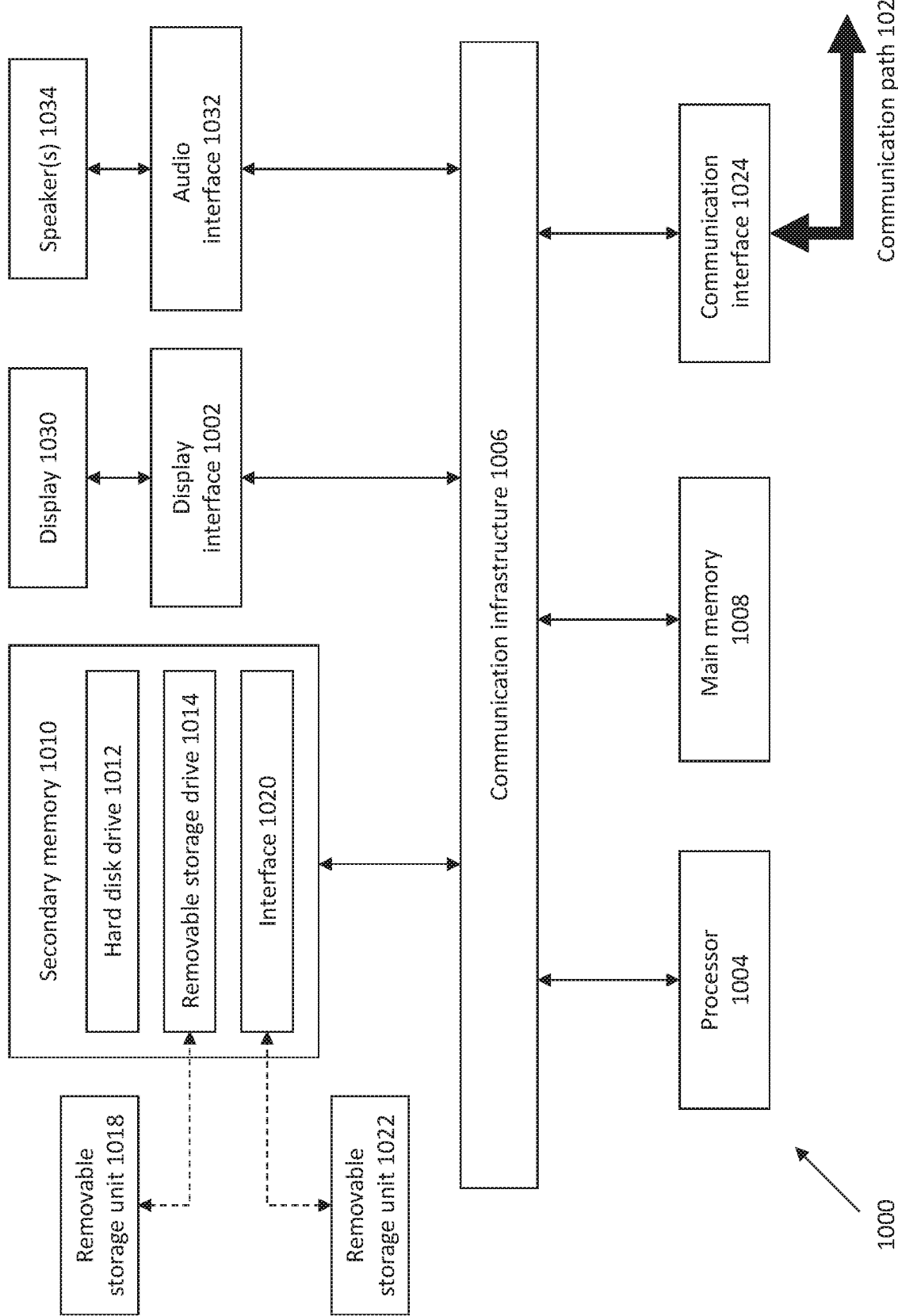
FIG. 7 is an example computer system for use in various embodiments.

FIG. 7 depicts an example computing device 1000. The following description of the computing device 1000 is provided by way of example only and is not intended to be limiting.

The example computing device 1000 includes a processor 1004 for executing software routines. Although a single processor is shown for the sake of clarity, the computing device 1000 may also include a multi-processor system. The processor 1004 is connected to a communication infrastructure 1006 for communication with other components of the computing device 1000. The communication infrastructure 1006 may include, for example, a communications bus, cross-bar, or network.

The computing device 1000 further includes a main memory 1008, such as a random access memory (RAM), and a secondary memory 1010. The secondary memory 1010 may include, for example, a hard disk drive 1012 and/or a removable storage drive 1014, which may include a floppy disk drive, a magnetic tape drive, an optical disk drive, or the like. The removable storage drive 1014 reads from and/or writes to a removable storage unit 1018 in a well-known manner. The removable storage unit 1018 may include a floppy disk, magnetic tape, optical disk, or the like, which is read by and written to by removable storage drive 1014. As will be appreciated by persons skilled in the relevant art(s), the removable storage unit 1018 includes a computer readable storage medium having stored therein computer executable program code instructions and/or data.

In an alternative implementation, the secondary memory 1010 may additionally or alternatively include other similar means for allowing computer programs or other instructions to be loaded into the computing device 1000. Such means can include, for example, a removable storage unit 1022 and an interface 1020. Examples of a removable storage unit 1022 and interface 1020 include a program cartridge and cartridge interface (such as that found in video game console devices), a removable memory chip (such as an EPROM or PROM) and associated socket, and other removable storage units 1022 and interfaces 1020 which allow software and data to be transferred from the removable storage unit 1022 to the computer system 1000.

The computing device 1000 also includes at least one communication interface 1024. The communication interface 1024 allows software and data to be transferred between computing device 1000 and external devices via a communication path 1026. In various embodiments, the communication interface 1024 permits data to be transferred between the computing device 1000 and a data communication network, such as a public data or private data communication network. The communication interface 1024 may be used to exchange data between a plurality of different computing devices 1000 that together form an interconnected computer network. Examples of a communication interface 1024 can include a modem, a network interface (such as an Ethernet card), a communication port, an antenna with associated circuitry and the like. The communication interface 1024 may be wired or may be wireless. Software and data transferred via the communication interface 1024 are in the form of signals which can be electronic, electromagnetic, optical or other signals capable of being received by communication interface 1024. These signals are provided to the communication interface via the communication path 1026.

As shown in FIG. 7, the computing device 1000 further includes a display interface 1002 which performs operations for rendering images to an associated display 1030 and an audio interface 1032 for performing operations for playing audio content via associated speaker(s) 1034.

As used herein, the term "computer program product" may refer, in part, to removable storage unit 1018, removable storage unit 1022, a hard disk installed in hard disk drive 1012, or a carrier wave carrying software over communication path 1026 (wireless link or cable) to communication interface 1024. A computer readable medium can include magnetic media, optical media, or other recordable media, or media that transmits a carrier wave or other signal. These computer program products are devices for providing software to the computing device 1000.

The computer programs (also called computer program code) are stored in main memory 1008 and/or secondary memory 1010. Computer programs can also be received via the communication interface 1024. Such computer programs, when executed, enable the computing device 1000 to perform one or more features of embodiments discussed herein. In various embodiments, the computer programs, when executed, enable the processor 1004 to perform features of the above-described embodiments. Accordingly, such computer programs represent controllers of the computer system 1000.

Software may be stored in a computer program product and loaded into the computing device 1000 using the removable storage drive 1014, the hard disk drive 1012, or the interface 1020. Alternatively, the computer program product may be downloaded to the computer system 1000 over the communications path 1026. The software, when executed by the processor 1004, causes the computing device 1000 to perform functions of embodiments described herein.

It is to be understood that the embodiment of FIG. 7 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts.

It will be appreciated that the elements illustrated in FIG. 7 function to provide means for performing the various functions and operations of the servers as described in the above embodiments.

The client devices of the above-described embodiments may be a wireless computing device. An example wireless computing device is described below with respect to FIG. 8.

Figure 8:
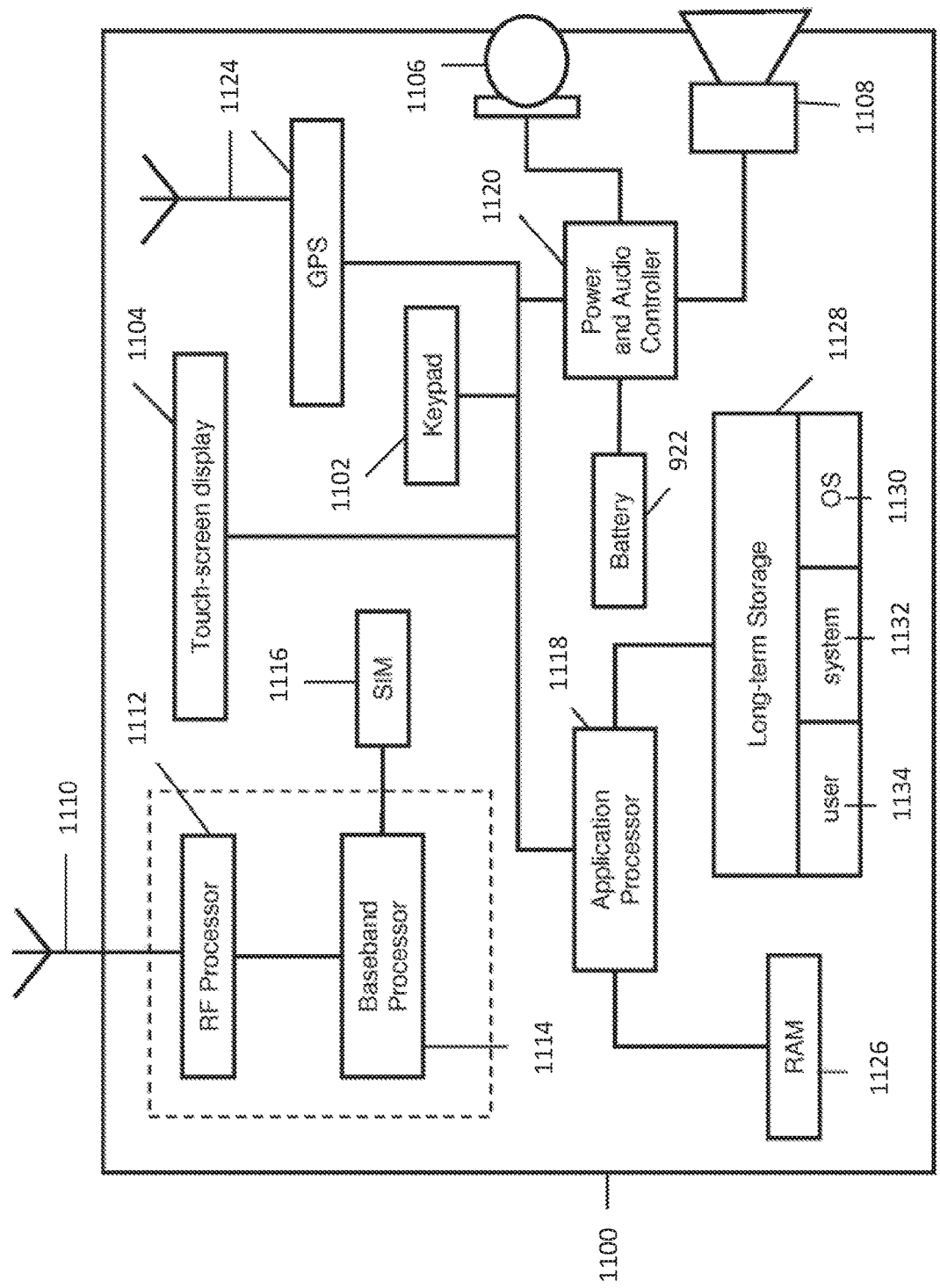
FIG. 8 is an example computing device for use in various embodiments.

FIG. 8 is a schematic of an example wireless computing device 1100. The following description of the wireless computing device 1100 is provided by way of example only and is not intended to be limiting.

The wireless device 1100 comprises a keypad 1102, a touch-screen 1104, a microphone 1106, a speaker 1108 and an antenna 1110. The wireless device 1100 is capable of being operated by a user to perform a variety of different functions, such as, for example, hosting a telephone call, sending an SMS message, browsing the Internet, sending an email and providing satellite navigation.

The wireless device 1100 comprises hardware to perform communication functions (e.g. telephony, data communication), together with an application processor and corresponding support hardware to enable the wireless device 1100 to have other functions, such as, messaging, Internet browsing, email functions and the like. The communication hardware is represented by the RF processor 1112 which provides an RF signal to the antenna 1110 for the transmission of data signals, and the receipt therefrom. Additionally provided is a baseband processor 1114, which provides signals to and receives signals from the RF Processor 1112. The baseband processor 1114 also interacts with a subscriber identity module 1116, as is well known in the art. The communication subsystem enables the wireless device 1100 to communicate via a number of different communication protocols including 3G, 4G, GSM, WiFi, Bluetooth™ and/or CDMA. The communication subsystem of the wireless device 1100 is beyond the scope of the present invention.

The keypad 1102 and the touch-screen 1104 are controlled by an application processor 1118. A power and audio controller 1120 is provided to supply power from a battery 1122 to the communication subsystem, the application processor 1118, and the other hardware. The power and audio controller 1120 also controls input from the microphone 1106, and audio output via the speaker 1108. Also provided is a global positioning system (GPS) antenna and associated receiver element 1124 which is controlled by the application processor 1118 and is capable of receiving a GPS signal for use with a satellite navigation functionality of the wireless device 1100.

In order for the application processor 1118 to operate, various different types of memory are provided. Firstly, the wireless device 1100 includes Random Access Memory (RAM) 1126 connected to the application processor 1118 into which data and program code can be written and read from at will. Code placed anywhere in RAM 1126 can be executed by the application processor 1118 from the RAM 1126. RAM 1126 represents a volatile memory of the wireless device 1100.

Secondly, the wireless device 1100 is provided with a long-term storage 1128 connected to the application processor 1118. The long-term storage 1128 comprises three partitions, an operating system (OS) partition 930, a system partition 1132 and a user partition 1134 The long-term storage 1128 represents a non-volatile memory of the wireless device 1100.

In the present example, the OS partition 1130 contains the firmware of the wireless device 1100 which includes an operating system. Other computer programs may also be stored on the long-term storage 1128, such as application programs, and the like. In particular, application programs which are mandatory to the wireless device 1100, such as, in the case of a smartphone, communications applications and the like are typically stored in the system partition 1132. The application programs stored on the system partition 1132 would typically be those which are bundled with the wireless device 1100 by the device manufacturer when the wireless device 1100 is first sold.

Application programs which are added to the wireless device 1100 by the user would usually be stored in the user partition 1134.

As stated, the representation of FIG. 8 is schematic. In practice, the various functional components illustrated may be substituted into one and the same component. For example, the long-term storage 1128 may comprise NAND flash, NOR flash, a hard disk drive or a combination of these. Additionally, one or more components maybe omitted.

It is to be understood that the devices and databases of any one of the above-described embodiments may be generally described as a physical apparatus including at least one processor and at least one memory having computer program code. The at least one memory and the computer program code are configured to, with the at least one processor, cause the physical apparatus to perform the above-described operations of an embodiment. This general description also provides a general description of the example computer system of FIG. 7 and the example wireless device of FIG. 8.

It will be appreciated by a person skilled in the art that numerous variations and/or modifications may be made to one or more of the above-described embodiments without departing from the scope of the appended claims. The above-described embodiments are, therefore, to be considered in all respects to be illustrative and not restrictive.

The features and advantages of various different embodiments are described above with reference to the Figures. It is to be understood that one or more features from one embodiment may be combined with one or more features of one or more other embodiments to form new embodiments which are covered by the scope of the appended claims.

Although the invention has been described above with reference to one or more preferred embodiments, it will be appreciated that various changes or modifications may be made without departing from the scope of the invention as defined in the appended claims.

The invention claimed is:

1. A method of secure data transmission within a system comprising a database, a client device, and a server device, the database being in communication with the server device, the server device being in communication with the client device, the method comprising:
sending a data request from the client device to the server device, the data request comprising a first share of a first encryption key, and a first location in the database at which is located desired double-encrypted data;
receiving the sent data request at the server device;
extracting, at the server device, the first share and the first location from the received data request;
obtaining, at the server device, the desired double-encrypted data from the database using the extracted first location;
generating, at the server device, the first encryption key using the extracted first share and one or more additional shares of the first encryption key held by the server device;
decrypting, at the server device, the obtained desired double-encrypted data using the generated first encryption key to form single-encrypted data;
sending the single-encrypted data from the server device to the client device;
receiving the single-encrypted data at the client device; and
decrypting, at the client device, the received single-encrypted data using a second encryption key held by the client device, to form unencrypted data,
wherein the method further comprises:
obtaining, at the client device, a first code corresponding to the desired double-encrypted data; and
generating, at the client device, the second encryption key and the first location from the obtained first code;
obtaining, at the client device, a second code corresponding to the desired double-encrypted data;
generating, at the client device, a third encryption key and a second location from the obtained second code, the second location being a location in the database at which is located an encrypted first share of the first code;

sending the second location from the client device to the server device;
receiving the second location at the server device;
obtaining, at the server device, the encrypted first share of the first code from the database using the second location;
sending the encrypted first share of the first code from the server device to the client device;
receiving the encrypted first share of the first code at the client device;
decrypting, at the client device, the encrypted first share of the first code using the third encryption key to obtain an unencrypted first share of the first code;
generating, at the client device, the first code from the unencrypted first share of the first code and one or more additional shares of the first code held by the client device.

2. The method of claim 1, wherein the second encryption key is generated by performing a first hash function on the obtained first code.

3. The method of claim 2, wherein the first location is generated by performing a second hash function on the generated second encryption key.

4. The method of claim 1, wherein the third encryption key is generated by performing a third hash function on the obtained second code.

5. The method of claim 4, wherein the second location is generated by performing a fourth hash function on the generated third encryption key.

6. The method of claim 5, when dependent on claim 3, further comprising:
performing, at the server device, at least one additional hash function on the second location to generate a possible register entry;
comparing, at the server device, the possible register entry with stored register entries from a register stored on the database;
determining, at the server device, that the possible register entry matches a stored register entry; and
aborting, at the server device, communication with the client device based on the stored register entry.

7. The method of claim 6, further comprising:
determining, at the server device, that security of the second code has been compromised;
performing, at the server device, the third hash function on the second code to generate the third encryption key, performing, at the server device, the fourth hash function on the generated third encryption key to generate the second location, and
performing, at the server device, the at least one additional hash function on the generated second location to generate a register entry;
storing, by the server device, the register entry in the register stored on the database to indicate that the second code has been compromised and communication should be aborted.

8. The method of claim 1, wherein the second code is received at the client device via an input from a user of the client device.

9. The method of claim 1, further comprising:
generating, at the client device, a database of the unencrypted data.

10. The method of claim 1, wherein a share of the first encryption key is a share of a secret sharing method.

11. The method of claim 1, further comprising:
before establishing communication between the server device and the client device, sending from the server device to the client device a request for authentication;
receiving the request for authentication at the client device;
sending authentication information from the client device to the server device;
receiving the authentication information at the server device;
comparing, at the server device, the received authentication information with registered authentication information obtained by the server device and associated with the client device; and
establishing communication between the server device and the client device only if the received authentication information matches the registered authentication information.

12. A system for secure data transmission, the system comprising: a database having stored thereon double-encrypted data;
a server device in communication with the database; and
a client device in communication with the server device;
the client device being operable to send a data request to the server device, the data request comprising a first share of a first encryption key, and a first location in the database at which is located desired double-encrypted data;
the server device being operable to receive the sent data request, extract the first share and the first location therefrom, and then obtain the desired double-encrypted data from the database using the extracted first location, the server device being further operable to generate the first encryption key using the extracted first share and one or more additional shares held by the server device, and then decrypt the obtained desired double-encrypted data using the generated first encryption key to form single-encrypted data; and
wherein the server device is operable to send the single-encrypted data to the client device, and the client device is operable to receive the sent single-encrypted data and to decrypt the single-encrypted data using a second encryption key held by the client device to form unencrypted data;
wherein the client device is further operable to obtain a first code corresponding to the desired double-encrypted data and generate the second encryption key and the first location from the obtained first code, and obtain a second code corresponding to the desired double-encrypted data and generate a third encryption key and a second location from the obtained second code, the second location being a location in the database at which is located an encrypted first share of the first code;
the server device being further operable to receive the second location, obtain the encrypted first share of the first code from the database using the second location and send the encrypted first share of the first code to the client device;
the client device being subsequently operable to receive the encrypted first share of the first code and decrypt the encrypted first share of the first code using the third encryption key to obtain an unencrypted first share of the first code, and generate the first code from the unencrypted first share of the first code and one or more additional shares of the first code held by the client device.

13. A client device for use in a system for secure data transmission, the system comprising a database having stored thereon double-encrypted data, a server device in communication with the database, and the client device in communication with the server device, the client device comprising at least one processor and at least one memory including computer program code, wherein the at least one memory and the computer program code are configured to, with the at least one processor, cause the device to perform at least the following:

send a data request to the server device, the data request comprising a first share of a first encryption key, and a first location in the database at which is located desired double-encrypted data;

receive single-encrypted data from the server device in response to the sent data request;

decrypt the received single-encrypted data using a second encryption key held by the client device to form unencrypted data;

obtain a first code corresponding to the desired double-encrypted data and generate the second encryption key and the first location from the obtained first code;

obtain a second code corresponding to the desired double-encrypted data and generate a third encryption key and a second location from the obtained second code, the second location being a location in the database at which is located an encrypted first share of the first code;

receive the encrypted first share of the first code and decrypt the encrypted first share of the first code using the third encryption key to obtain an unencrypted first share of the first code; and generate the first code from the unencrypted first share of the first code and one or more additional shares of the first code held by the client device.

14. A server device for use in a system for secure data transmission, the system comprising a database having stored thereon double-encrypted data and being in communication with the server device, a client device in communication with the server device, and the server device, the server device comprising at least one processor and at least one memory including computer program code, wherein the at least one memory and the computer program code are configured to, with the at least one processor, cause the device to perform at least the following:

receive a data request from the client device, the data request comprising a first share of a first encryption key, and a first location in the database at which is located desired double-encrypted data, extract the first share and the first location from the received data request;

obtain the desired double-encrypted data from the database using the extracted first location;

generate the first encryption key using the extracted first share and one or more additional shares held by the server device;

decrypt the obtained desired double-encrypted data using the generated first encryption key to form single-encrypted data;

send the single-encrypted data to the client device;

receive a second location from the client device; and obtain an encrypted first share of a first code from the database using the second location and send the encrypted first share of the first code to the client device.

15. A non-transitory computer-readable storage medium having stored thereon computer program code which when executed by a computer causes the computer to execute to following method:

sending a data request to a server device, the data request comprising a first share of a first encryption key, and a first location in the database at which is located desired double-encrypted data;

receiving single-encrypted data from the server device in response to the sent data request; and decrypting the received single-encrypted data using a held second encryption key to form unencrypted data;

obtaining a second code corresponding to the desired double-encrypted data and generate a third encryption key and a second location from the obtained second code, the second location being a location in the database at which is located an encrypted first share of a first code;

receiving the encrypted first share of the first code and decrypt the encrypted first share of the first code using the third encryption key to obtain an unencrypted first share of the first code; and generating the first code from the unencrypted first share of the first code and one or more additional shares of the first code held by the client device.

16. A non-transitory computer-readable storage medium having stored thereon computer program code which when executed by a computer causes the computer to execute to following method:

receiving a data request from a client device, the data request comprising a first share of a first encryption key, and a first location in a database at which is located desired double-encrypted data, extracting the first share and the first location from the received data request;

obtaining the desired double-encrypted data from the database using the extracted first location;

generating the first encryption key using the extracted first share and one or more stored additional shares;

decrypting the obtained desired double-encrypted data using the generated first encryption key to form single-encrypted data;

sending the single-encrypted data to the client device;

receive a second location from the client device;

obtaining an encrypted first share of a first code from the database using the second location; and sending the encrypted first share of the first code to the client device.

* * * * *